(12) United States Patent
Mase et al.

(10) Patent No.: US 7,447,994 B2
(45) Date of Patent: Nov. 4, 2008

(54) SETUP PROGRAM, RECORDING MEDIUM, AND SETUP METHOD

(75) Inventors: Kouichi Mase, Chiba-ken (JP); Harunobu Maeda, Shizuoka-ken (JP); Hiroki Miyachi, Kanagawa-ken (JP); Yoshiko Suenaga, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 86 days.

(21) Appl. No.: 11/264,320

(22) Filed: Oct. 31, 2005

(65) Prior Publication Data

US 2006/0098685 A1      May 11, 2006

(30) Foreign Application Priority Data

Nov. 10, 2004   (JP) .............................. 2004-327013

(51) Int. Cl.
G06F 15/177   (2006.01)
G06F 13/00    (2006.01)
G06F 9/00     (2006.01)
G06F 9/24     (2006.01)
G05B 15/00    (2006.01)

(52) U.S. Cl. ...................... 715/735; 700/83; 709/220; 710/104; 713/1

(58) Field of Classification Search ................ 717/100, 717/105, 121, 174; 715/513, 735, 965; 709/219, 709/220, 223, 200; 700/17, 83; 713/1; 710/104
See application file for complete search history.

(56) References Cited

U.S. PATENT DOCUMENTS 5,966,532 A *  10/1999  McDonald et al. .......... 717/105
6,104,393 A *  8/2000   Santos-Gomez ............ 715/763
6,871,340 B1*  3/2005   Gillis ........................ 717/100
7,117,256 B1*  10/2006  Blinn ......................... 709/219
7,120,700 B2*  10/2006  Macleod Beck et al. .... 709/242
7,197,700 B2*  3/2007   Honda et al. ................ 715/513

(Continued)

FOREIGN PATENT DOCUMENTS

JP       11-282653       10/1999

(Continued)

*Primary Examiner*—Crystal Barnes Bullock
(74) *Attorney, Agent, or Firm*—SoCal IP Law Group LLP; Steven C. Sereboff; John E. Gunther

(57) ABSTRACT

A setup program, a recording medium, and a setup method are provided that can readily reduce wrong settings. The setup program includes a plurality of setting modules that are provided to realize a plurality of process settings independently of one another, the processing settings being required depending on the contents of a setting environment, the setting modules respectively corresponding to the process settings. The setup program causes a computer to function as: setup confirming section which displays a questionnaire containing a plurality of questions to inquire about functions to be used and the contents of a network environment, and obtains answers to the questions before a setup operation; wizard creating section which selects a plurality of setting modules that need setting depending on the functions to be used and the network environment, using each of the answers obtained by the setup confirming section, and creates a setup wizard by combining the selected setting modules; and setup performing section which executes the selected setting modules in accordance with the setup wizard created by the wizard creating section.

3 Claims, 6 Drawing Sheets

U.S. PATENT DOCUMENTS

| | | | |
|---|---|---|---|
| 2002/0087966 A1* | 7/2002 | Wiginton et al. | 717/174 |
| 2003/0222898 A1* | 12/2003 | Macomber et al. | 345/709 |
| 2003/0236865 A1* | 12/2003 | Anthe et al. | 709/220 |
| 2004/0073564 A1* | 4/2004 | Haber et al. | 707/101 |
| 2004/0153343 A1* | 8/2004 | Gotlib et al. | 705/3 |
| 2004/0221267 A1* | 11/2004 | Chase et al. | 717/121 |
| 2005/0010446 A1* | 1/2005 | Lash et al. | 705/2 |
| 2005/0209903 A1* | 9/2005 | Hunter et al. | 705/9 |
| 2006/0047797 A1* | 3/2006 | Brown et al. | 709/223 |

FOREIGN PATENT DOCUMENTS

| | | |
|---|---|---|
| JP | 2003-256164 | 9/2003 |

\* cited by examiner

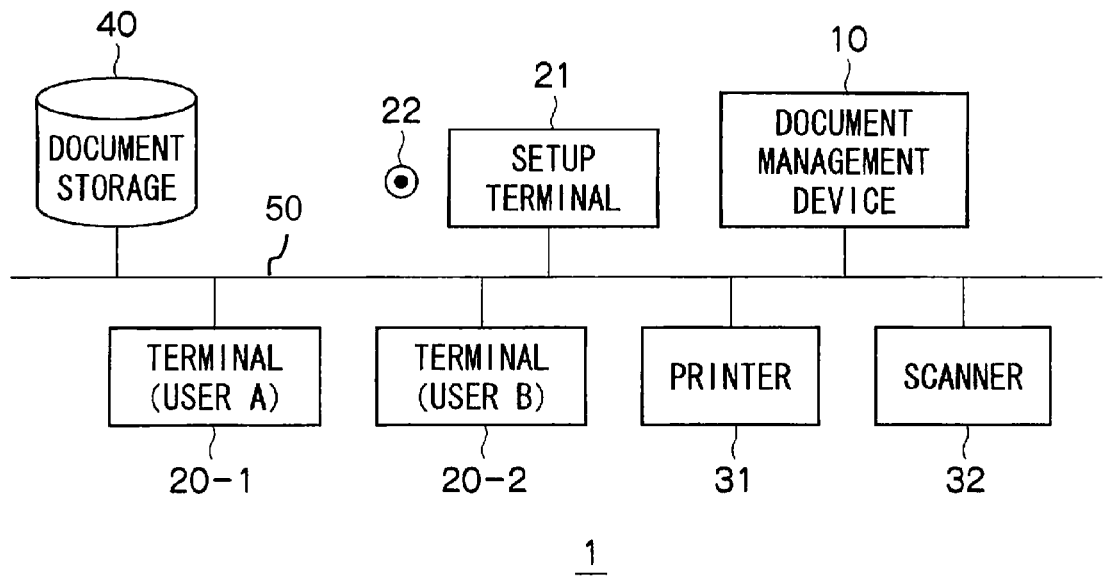

SETUP PROGRAM, RECORDING MEDIUM, AND SETUP METHOD

This application claims priority from Japanese patent application JP2004-327013, filed Nov. 10, 2004.

BACKGROUND OF THE INVENTION

1. Field of the Invention

The present invention relates to a setup program, a recording medium, and a setup method, and, more particularly, to a setup method for connecting a document management device that manages designated documents to a network.

2. Description of the Related Art

In recent years, document management systems that can be connected to networks have been developed. A typical example of a document management system registers documents designated by users, transfers the documents to designated networking equipment, manages the documents among users, automatically converts file formats, outputs (or prints out) files, and performs a predetermined operation on each newly registered document.

When such a document management device (such as a server) that performs such various functions or relevant networking equipment is added to a network, it is necessary to set up an environment in accordance with a network environment and the functions to be used.

By a conventional setup method for setting up a server device or network equipment, a prepared setup wizard is activated, and, in accordance with the setup wizard, a user selects necessary functions and sets up a network environment to be connected.

A conventional setup wizard is formed with an operation flow containing setting and selecting items between a setup start and a setup end, as shown in FIG. 2. Through a changing display screen, a user needs to set or select items suitable for the network environment and the necessary functions.

Japanese Patent Application Laid-Open No. 2003-256164 discloses a technique relating to setup operations for printers, and also discloses a printer control program by which a dialogue box with a caption in a language that users can understand is displayed.

However, by conventional setup methods for server devices and network equipment, including the above setup technique disclosed in JP-A No. 2003-256164, it is necessary to select necessary functions and set up a network environment in accordance with a setup wizard formed with a series of operation flows, as described above.

Therefore, users need to fully grasp the functions of each device to be connected and necessary information required for setting up a network environment, which imposes a burden on the users.

Even if users grasp the conditions required for setup, wrong setting might be caused due to the complexity of the setting items.

Furthermore, it is desirable that users are informed, before or during a setup operation, of the information relating to setup, such as the information required for the setup and the procedures for the setup.

Also, the above described conventional setup wizard is formed with a series of predetermined operation flows. If a setup operation is aborted when a user does not know the setting items, the user needs to start the setup from the beginning again.

SUMMARY OF THE INVENTION

The present invention provides a setup program, a recording medium, and a setup method with and by which a setting environment for a device connected to a network can be readily set on the user side as accurately as possible.

The setup program in accordance with the present invention is a program for setting an environment of a network device that is connected to a network. This setup program includes a plurality of setting modules that are provided to realize a plurality of process settings independently of one another, the processing settings being required depending on the contents of a setting environment, the setting modules respectively corresponding to the process settings. This setup program causes a computer to function as: setup confirming section which displays a questionnaire containing a plurality of questions to inquire about functions to be used and the contents of a network environment, and obtains answers to the questions before a setup operation; wizard creating section which selects a plurality of setting modules that need setting depending on the functions to be used and the network environment, using each of the answers obtained by the setup confirming section, and creates a setup wizard by combining the selected setting modules; and setup performing section which executes the selected setting modules in accordance with the setup wizard created by the wizard creating section.

The recording medium in accordance with the present invention is a computer-readable recording medium in which the above described setup program of the present invention is recorded.

The setup method in accordance with the present invention is a method equivalent to the above described setup program of the present invention. More specifically, the setup method in accordance with the present invention is a method for setting an environment of a network device that is connected to a network, with a plurality of setting modules being provided to realize a plurality of process settings independently of one another, the processing settings being required depending on the contents of a setting environment, the setting modules respectively corresponding to the process settings. This method includes the steps of: displaying a questionnaire containing a plurality of questions to inquire about functions to be used and the contents of a network environment, and obtaining answers to the questions before a setup operation, by the setup confirming section; selecting a plurality of setting modules that need setting depending on the functions to be used and the network environment, using each of the answers obtained by the setup confirming section, and creating a setup wizard by combining the selected setting modules, by the wizard creating section; and executing the selected setting modules in accordance with the setup wizard, by the setup performing section.

BRIEF DESCRIPTION OF THE DRAWINGS

FIG. 3 shows the entire structure of a document managing system of the embodiment;

FIG. 4 shows the questions in a questionnaire of the embodiment;

DESCRIPTION OF THE PREFERRED EMBODIMENTS

Figure 1:
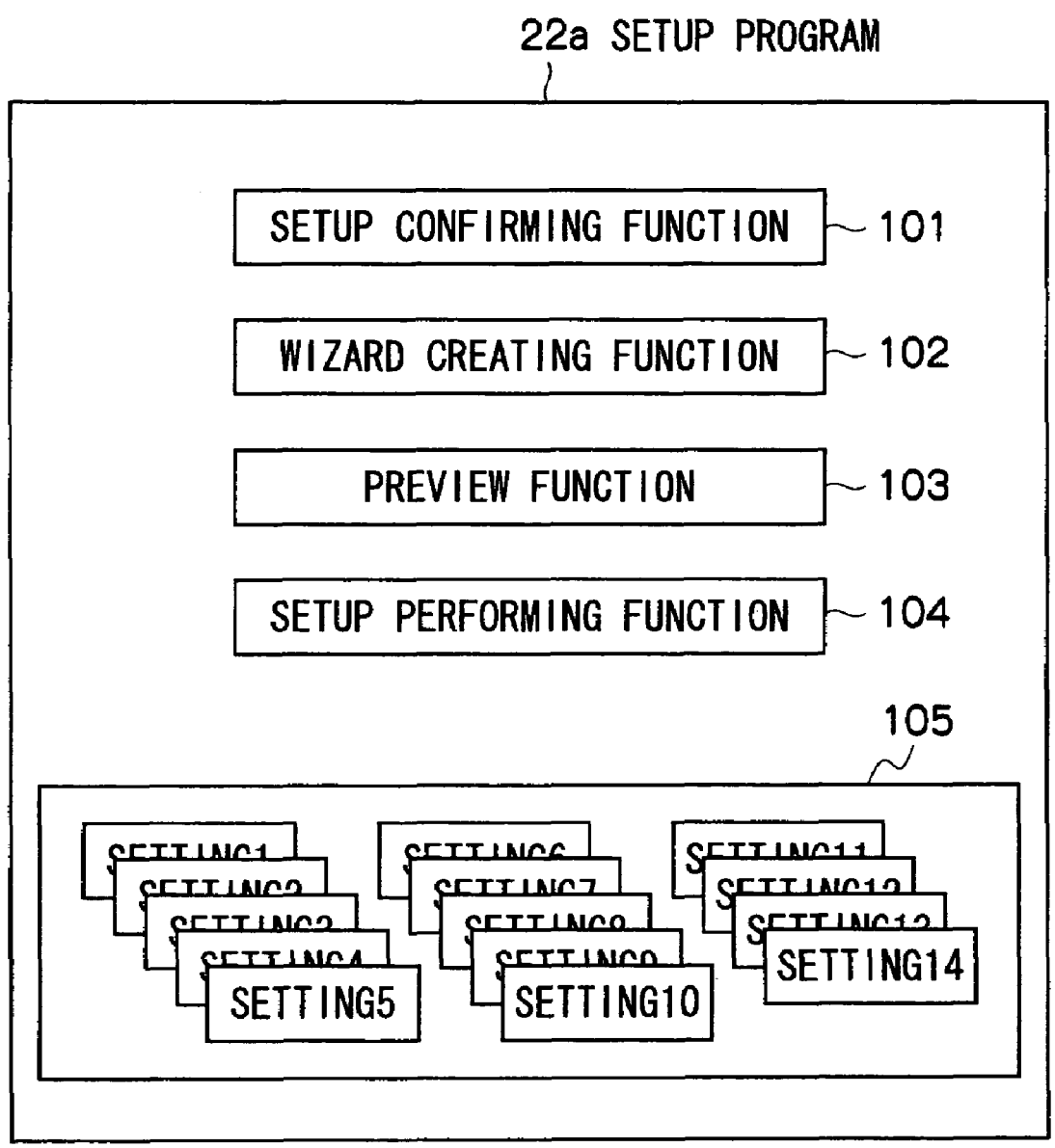
FIG. 1 is a functional block diagram showing the functional structure of a setup program in accordance with an embodiment of the present invention.
Figure 2:
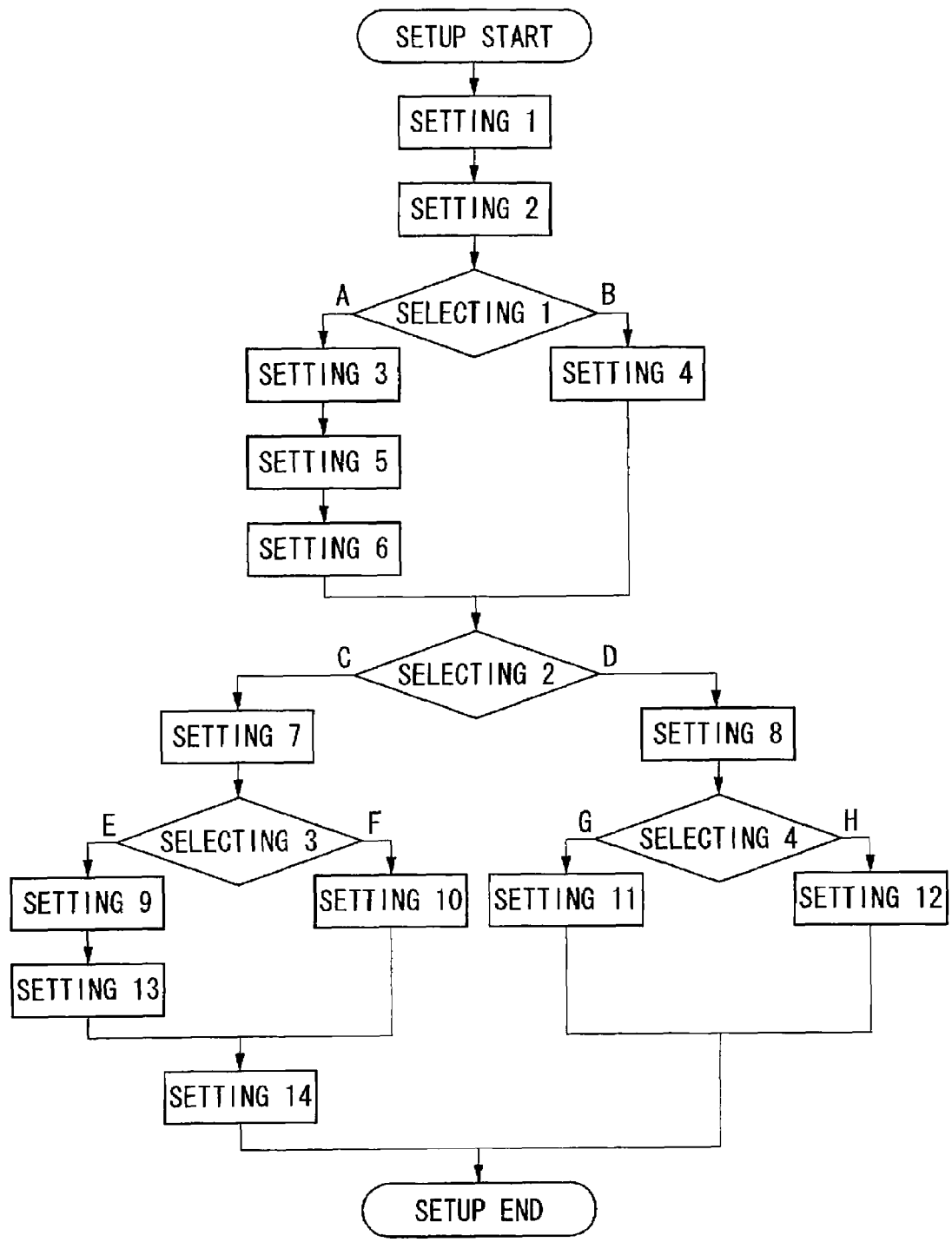
FIG. 2 shows the structure of a conventional setup wizard.

The following is a description of preferred embodiments of setup programs, recording media, and setup methods in accordance with the present invention, with reference to the accompanying drawings.

(A) Embodiment

In the following embodiment, the present invention is applied to a setup process for setting the configuration of a document management device (a server) after the document management device is connected to a closed network to which terminals, printers, scanners and the likes are connected through communication lines.

(A-1) Structure of the Embodiment

FIG. 3 shows the entire main network structure of a document management system that includes a document management device for which a configuration is to be set.

As shown in FIG. 3, the document management system 1 of this embodiment includes a document management device 10 that performs setup, a setup terminal 21, terminals 20-1 and 20-2, a printer 31, a scanner 32, and a document storage unit 40. The terminals 20-1 and 20-2 will be referred to as the terminal 20 when the common functions between the terminals 20-1 and 20-2 are described.

In the document management system 1 of this embodiment, each of the components is connected to a communication line 50, and a closed network is formed. It is of course possible to expand the structure to an open network with a relay unit that is connected to another network and has a data converting function and the like.

The setup terminal 21 is a user terminal that sets a configuration for the document management device 10 connected to the communication line 50, and includes at least a monitor and an operating unit. This setup terminal 21 may be a personal computer, for example. The setup terminal 21 also includes a control unit such as a CPU (not shown), and performs setup by reading a setup program 22*a* from a recording medium 22 which stores the setup program 22*a* and executing the setup program 22*a* with the control unit. The setup program 22*a* may also be stored in the main memory of the setup terminal 21 in advance.

The operation of the connection setup of the document management device 10 is not limited to the operation by the setup terminal 21. For example, the document management device 10 may include a monitor and an operating unit for setup, and perform setup using the monitor and the operating unit.

FIG. 1 shows an example functional structure of the setup program 22*a*.

As shown in FIG. 1, the functional structure of the setup program 22*a* includes a setup confirming function 101, a wizard creating function 102, a preview function 103, and a setup performing function 104, and a setting module group 105.

The setting module group 105 includes setting modules that need to be set according to the contents of each configuration set for the document management device 10 connected to the communication line 50.

Each module of the setting module group 105 is formed independently, so as to perform a necessary process for each setting. By executing one module, the corresponding setting is realized. When functions are added to the program at the time of upgrade or the like, for example, the upgraded modules can be added, without adverse influence on the other existing modules.

The interface with each module is shared by all the modules. Thus, the interface can be read out for each module.

Before setup is performed, the setup confirming function 101 causes a user to inquire about the network environment to which the document management device 10 is connected, and the function to be used by the user.

More specifically, when the setup confirming function 101 causes a user to inquire about the network environment or the function to be used, a questionnaire containing questions is displayed on the monitor of the setup terminal 21, and the answers to the questions are acquired. By doing so, it is possible to confirm the network environment and the functions to be used.

FIG. 4 is an example of the questionnaire that is displayed on the monitor by the setup confirmation function 101. As shown in FIG. 4, examples of the questions include an inquiry about the network environment such as "Is there a DHCP server?" and an inquiry about a selected function needed by the user such as "Is the mail function to be used?".

The questions can be set in advance by an engineer or the like. For example, the modules necessary for the setup are designed to be selected according to the answers to the questions, with the relationship between the network environment and the modules for setting the network environment being taken into consideration. Accordingly, several questions may be set for selecting one module.

When a function interrelates with another function, links to the function should be provided so as to prevent failures in the setup. For example, when a function A interrelates with a function a, the function a is always selected when the function A is selected according to the answer to a question. In this manner, the function a can be selected at the same time as the selection of the function A.

Further, when the questions include main questions and sub questions, answers may be made to a sub question if a positive answer is made to the corresponding main question. For example, a sub question is displayed only when a positive answer is made to the corresponding main question.

The setup confirming function 101 may also have a help function for showing the detailed contents of each inquired item and the meaning of each inquired word. With the help function, each user can understand the contents of specific questions.

Also, the list of questions to be displayed through the setup confirming function 101 may be printed out. By doing so, each user can clearly grasp the requirements for the setup in advance and can prepare suitable answers to the questions.

Based on the answers to the questions by the setup confirming function 101, the wizard creating function 102 selects modules suitable for the network environment and necessary functions, and creates a wizard to set up the selected modules.

In this embodiment, each module is formed by gathering items necessary for setup, and is completely independent of other modules.

More specifically, the wizard creating function 102 independently selects the modules suitable for the answers to the questions from the setting module group 105, and combines the selected modules to create a setup wizard.

Figure 5:
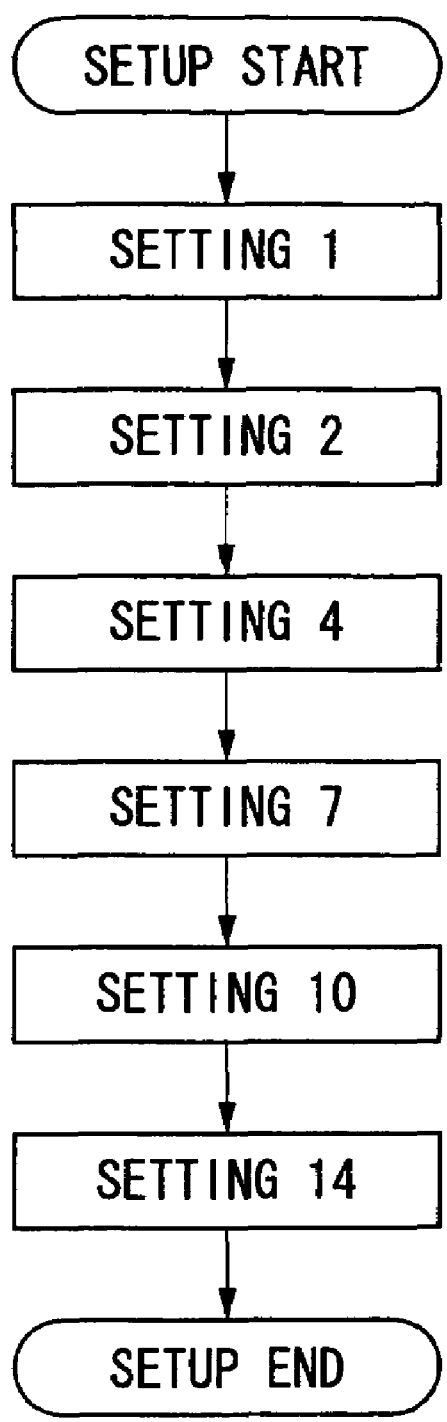
FIG. 5 shows the structure of a setup wizard of this embodiment.

FIG. 5 shows an example of a setup wizard created by the wizard creating function 102. In FIG. 5, based on the answers to the questions, six setting modules 1, 2, 4, 7, 10, and 14 are selected from the setting module group 105, and the setting modules are combined to form a setup wizard.

In this manner, a setup wizard that dynamically varies with the network environment according to the answers can be created, instead of a conventional setup wizard that is formed with a predetermined series of flows.

The wizard creating function 102 is designed to automatically select the minimum required modules for setup, regardless of the answers to the questions. The order of module combination by the wizard creating function 102 may be determined by combining the modules according to the numbers that are allotted to the setting modules in advance.

The wizard creating function 102 may have a storage function that temporarily stores a created setup wizard in response to a user operation. With the storage function, even if the answer to a question is not clear, a temporary setup wizard based on the previous answers can be created and stored.

The wizard creating function 102 can also add, modify, or delete the contents of a created setup wizard in response to a user operation.

The preview function 103 creates a preview based on the setup wizard created by the wizard creating function 102 prior to the setup and/or during the setup. The preview function 103 then displays the created preview.

For example, prior to the setup, the preview function 103 displays all the contents and the flow of the setup wizard, and may also display the time required for ending each setting and the end time at which all the settings are completed.

During the setup, the preview function 103 displays the setting that is currently performed, and may also display the remaining time required for ending the currently performed setting and the remaining time required for completing all the settings.

The setup performing function 104 executes the setting modules in accordance with the order of the setup wizard created by the wizard creating function 102.

The setup performing function 104 may also be able to execute setting modules that are not set in the setup wizard, in response to a user operation. By doing so, flexile setup can be performed in conformity with the user's intention.

The functional structure required for performing setup to connect the document management device 10 to the communication line 50 has been described so far. In the following, the structure of the document management system 1 of this embodiment shown in FIG. 3 is described in detail.

In FIG. 3, the terminal 20 may be a personal computer, for example. The terminal 20 has a mail transmission/reception function, and issues various instructions and requests to the document management device 10 in accordance with the operation of a user who is the system user. The terminal 20 also has a search and read function for searching and reading the contents of the files that are managed by the document management device 10. The terminal 20-1 is a terminal that is operated by a user A, and the terminal 20-2 is a terminal that is operated by a user B.

The printer 31 reads in the file that are managed by the document management device 10 in accordance with an instruction issued through the document management device 10 or the terminal 20, and performs printout based on the file data.

The scanner 32 reads in images to be filed in accordance with an instruction issued through the document management device 10 or the terminal 20, and provides and stores the image data as files in the document management device 10.

In FIG. 3, the printer 31 and the scanner 32 are shown as clear examples of the functions to input or output the contents of the files in the system 1. It is of course possible to employ some other image forming apparatus and some other image input device, or to employ a complex device such as a MFP (multi function printer) that is formed by integrating the functions of an image forming apparatus and an image input device.

The document management device 10 can execute the mail transmission/reception function, and can execute a document registering function, a shared document managing function, a file edition managing function, an automatic process sequence performing function, and a document distributing function, in accordance with various instructions and requests received from the terminal 20 operated by a user. The document management device 10 is designed to execute a mail function, either having a mail function in the device 10 or being allowed to use a mailing device in the outside. In this embodiment, the document management device 10 has a mail function.

The right of access to the document management device 10 is given only to the users of the document management system 1. A user exercises the right of access, so as to access the document management device 1.

Figure 6:
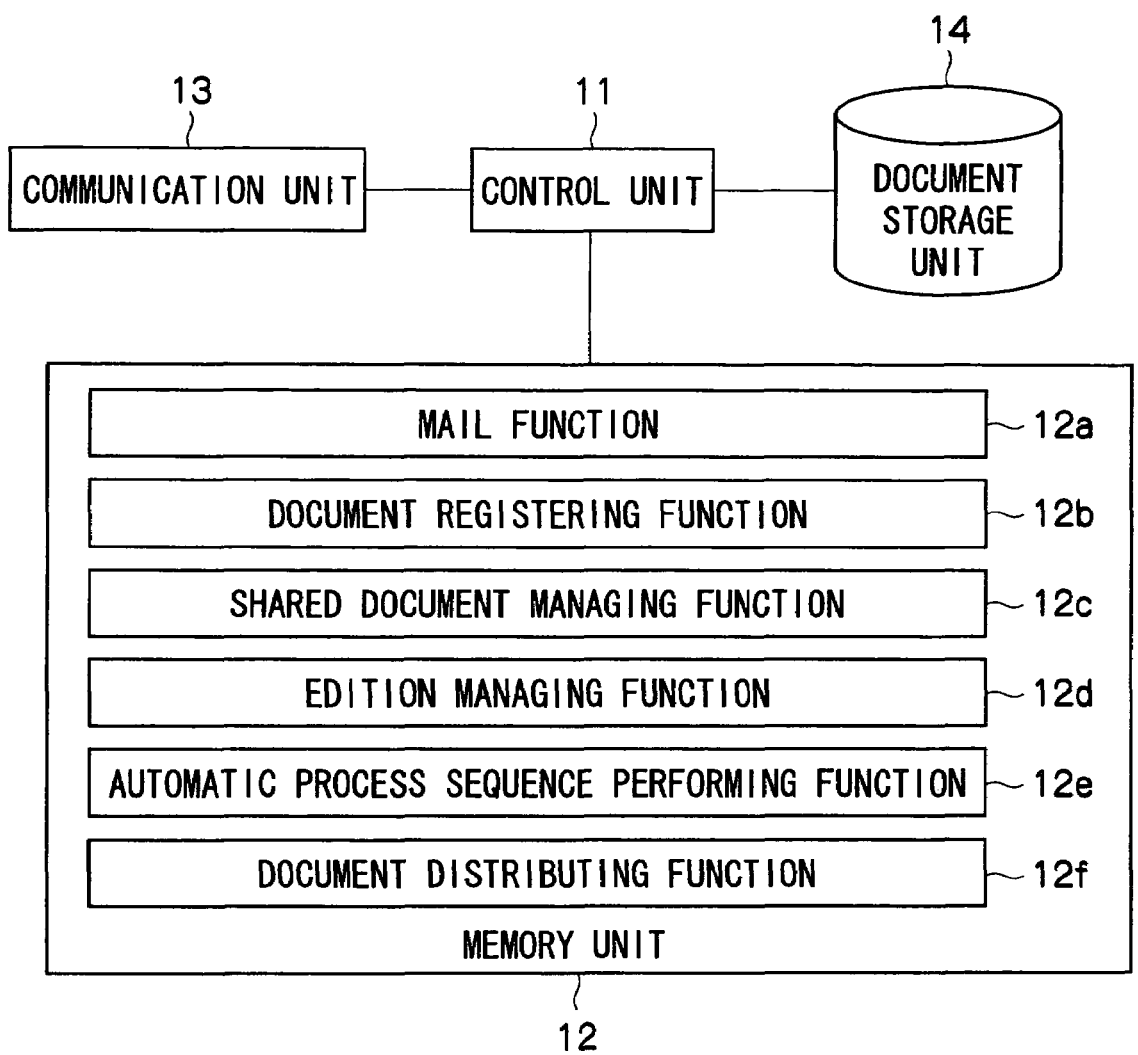
FIG. 6 is a block diagram showing the functional structure of a document management device of this embodiment.

FIG. 6 is a block diagram showing the inner structure and functions of the document management device 10. As shown in FIG. 6, the document management device 10 includes a control unit 11, a memory unit 12, a communication unit 13, and a document storage unit 14.

The control unit 11 may be a CPU, for example, and controls the functions to be executed as the document management device 10. The memory unit 12 may be a RAM or a ROM, for example, and stores processing programs to be executed by the control unit 11 and the data necessary for executing the processing programs. Examples of the processing programs include a mail function 12a, a document registering function 12b, a shared document managing function 12c, an edition managing function 12d, an automatic process sequence performing function 12e, and a document distributing function 12f. The control unit 11 executes the processing programs in the memory unit 12, so as to execute each of the functions.

The communication unit 13 performs a communicating operation by a predetermined communication method, under the control of the control unit 11. The document storage unit 14 stores registered files, and may be an external memory unit, for example. The document storage unit 14 may not be physically located in the device 10, as long as the control unit 11 can control the document storage unit 14.

Next, the functions to be realized by the document management device 10 are described. As described above, the functions to be realized by the document management device 10 are executed by the control unit 11 executing the processing programs stored in the storage unit 12.

The mail function 12a is executed to transmit and receive electronic mail to and from computers that are connected to the communication line 50 and have a mail function. Using the mail function 12a, the document management device 10 receives an instruction or a request from the terminal 20, or transmits or receives electronic mail to which a file is attached.

The document registering function 12b is executed to receive a registration instruction (an instruction via electronic mail, for example) from the terminal 20, and register and store the designated file in the designated folder in the document storage unit 14. The registration of the file may be performed to register a file attached to electronic mail in accordance with a registration instruction from the terminal 20, or may be performed to register a designated file obtained from the document storage unit 40 in accordance with a designated address in the document storage unit 40. The document registration function 12b also has a function for sorting files by recipient and storing the files into the folders each allotted to a user in the document storage unit 14. The document registration function 12b further has a function for sending a registered file to the designated terminal 20 or the printer 31 in accordance with an instruction or a request from the terminal 20. Through the above operations, designated files can be registered (stored), and registered files can be output.

The shared document managing function 12c is executed to store files designated from the terminal 20 in a shared folder and manage the files as shared files. The shared folder may be shared among all the users or may be shared among particular users. It is also possible to sort files into folders by contents (by the contents of each operation, for example). The shared document managing function 12c determines users who can access the shared folder, and allows access only from the particular users.

The edition managing function 12d is executed to manage the edition of a file when the stored file is read out and the contents of the file is edited and modified by a user. Although the edition managing function 12d of this embodiment is directed to the management of the number of updates of each modified file, the edition managing function 12d may manage the number of readout times of each file, the number of times the user who has requested readout uses the file, the dates of use, or the like.

The automatic process sequence performing function 12e is executed to sort predetermined process sequence into folders, and to perform the process sequence designated with respect to the files stored in a designated folder. The predetermined process sequences can be set by a design engineer or a user. When a file A is stored in a folder A, for example, the file A should be registered in the folder A when the file A is converted into a text file and is transmitted as electronic mail to the terminal 20, so that this process is preset and automatically repeated.

The document distributing function 12f is executed to distribute designated files as electronic mail to designated terminals 20 in accordance with an instruction from the terminals 20, or to distribute and output designated files to designated printers 31.

(A-2) Operation of Embodiment

Next, the setup operation of the document management device 10 connected to the communication line 50 is described in conjunction with the accompanying drawings.

Figure 7:
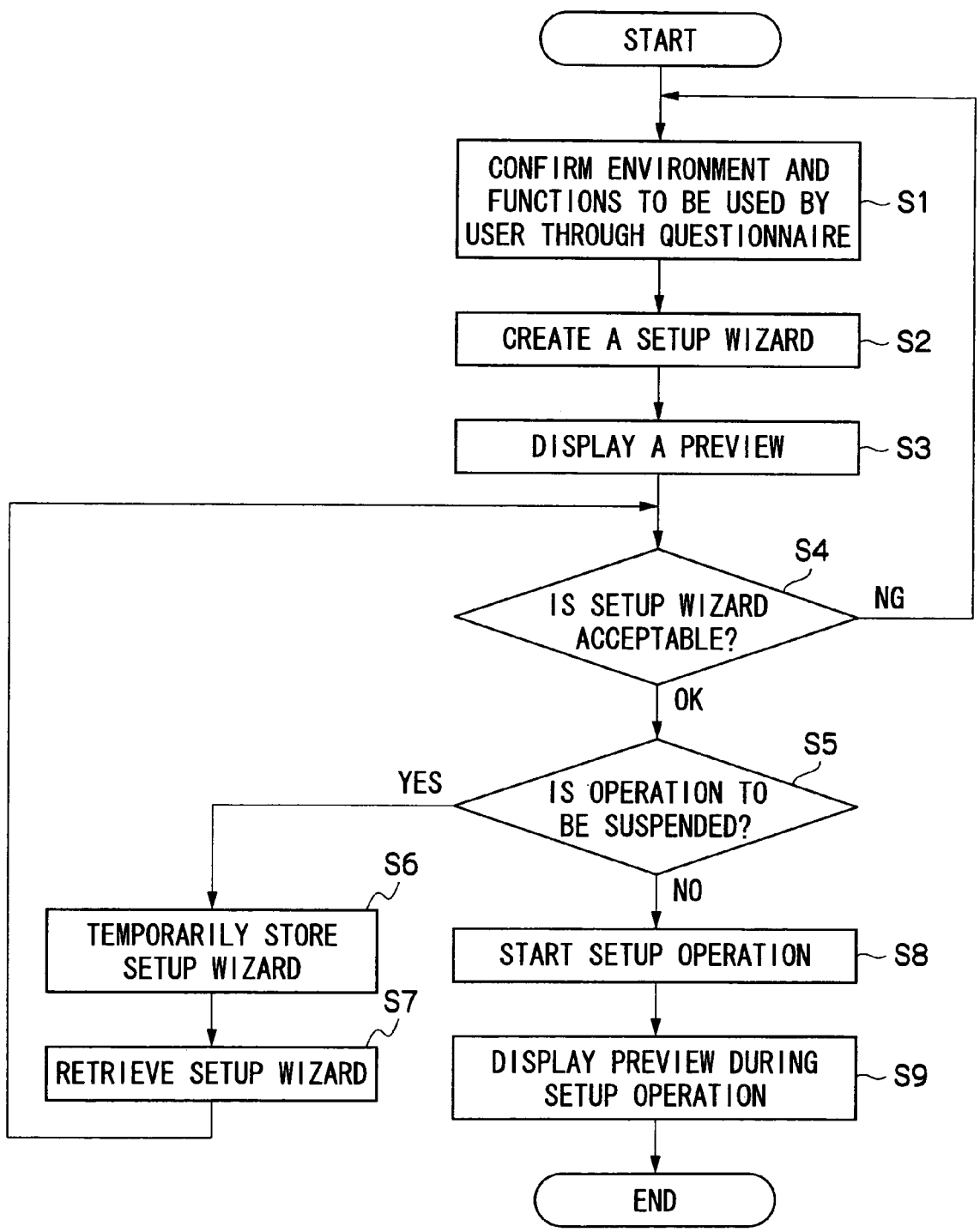
FIG. 7 is a flowchart of the setup operation of this embodiment.

FIG. 7 is a flowchart of the setup operation of the document management device 10.

After connecting the document management device 10 to the communication line 50, a user sets the recording medium 22 to the setup terminal 21, and operates to set up the document management device 10.

As the recording medium 22 containing the setup program 22a is set to the setup terminal 21, the controller reads out the setup program 22a stored in the recording medium 22, and executes each function in accordance with the setup program 22a.

First, the setup confirming function 101 of the setup program 22a is read out, and the questionnaire for a user to select a network environment and a desired function is displayed on the monitor of the setup terminal 21 (S1).

As the questionnaire is displayed on the monitor, answers to each of the displayed questions are input through the operating unit of the setup terminal 21, and the input answers are read in.

After the answers to the question in the questionnaire are read in, the wizard creating function 102 of the setup program 22a is read out, and the setting modules corresponding to the answers to the questions are retrieved from the setting module group 105. The retrieved setting modules are combined by the wizard creating function 102 according to a predetermined order, so as to create a setup wizard (S2).

After a setup wizard is created by the wizard creating function 102, the preview function 103 is read out, and a preview image of the created setup wizard is created and displayed on the monitor of the setup terminal 21 (S3).

As the preview image of the setup wizard is displayed on the monitor, the user checks the setup wizard out (S4). If the wizard is acceptable, the operation moves on to step S5. If the wizard is not acceptable, the operation returns to step S1, and the questionnaire is again displayed.

If the setup wizard is acceptable in step S4, an inquiry is made about whether the setup based on the wizard should be performed or the operation is suspended without the setup (S5).

If the setup is suspended, the setup wizard created by the wizard creating function 102 is temporarily stored in the memory unit (such as a RAM) of the setup terminal 21 (S6). In response to a user operation, the stored setup wizard is retrieved (S7), and an inquiry about whether the setup wizard is acceptable is again made in step S4. The operation is then continued.

Meanwhile, if the setup is to be performed, the setup performing function 104 of the setup program 22a is read out to sequentially execute the setting modules in accordance with the setup wizard created by the wizard creating function 102 (S8).

As the setup is performed by executing the setting modules, a preview image showing the setup processing state is created by the preview function 103 during the setup operation, and the preview image is displayed on the monitor of the setup terminal 21 (S9).

In this manner, all the setting modules are executed in accordance with the setup wizard, thereby completing the setup operation.

(A-3) Effects of the Embodiment

As described above, in accordance with this embodiment, users do not need to perform a complicated setup operation, and a setup operation is performed based on the answers to the questions in a questionnaire. Thus, wrong settings by a user can be prevented.

Also, necessary information for setup can be shown in advance, so as to reduce the burden on the user.

Also, when a user is allowed to use various functions like the functions of the document management device of this embodiment, a setup wizard that has contents variable with the environment can be created, as the contents of the environmental setting vary.

(B) Other Embodiments (B-1) Although the present invention is applied to a closed network in the above embodiment, it may be applied to an open network, instead of a closed network.

(B-2) In the structure shown in FIG. 3, the components (such as the terminals 20, the printer 31, and the scanner 32) of the network include a wireless communication device that performs wireless communications according to a predetermined wireless communication method. Also, the document management system 1 may be capable of communicating with mobile communication terminals (such as portable telephones and PHSs).

(B-3) Although the environmental setting for a document management device has been described in the above embodiment, the present invention can be applied to any network devices (networking equipment such as printers, scanners, facsimile devices, and complex devices) that can be connected to a network and require environmental setting.

(B-4) The setup operation described in the above embodiment is not limited by the flowchart of FIG. 7. For example, although a setup wizard is temporarily stored prior to the setup start in the flowchart of FIG. 7, it is also possible to temporarily store a setup wizard during a setup operation (until the setup end).

What is claimed is:

1. A network device that is connected to a network, comprising:
    a control unit;
    a memory coupled with the control unit, the memory having instructions stored therein,
        the instructions including a plurality of setting modules that are provided to realize a plurality of process settings independently of one another, the processing settings being required depending on the contents of a setting environment, the setting modules respectively corresponding to the process settings,
        the instructions when executed causing the network device to perform actions comprising:
        displaying a questionnaire containing a plurality of questions to inquire about a setting environment including functions to be used and the contents of a network environment, and obtaining answers to the questions;
        after obtaining answers to the question, selecting a plurality of setting modules that need setting depending on the functions to be used and the network environment as determined from the answers obtained to the questions, and creating a setup wizard by combining the selected setting modules;
        creating and displaying a preview image based on the setup wizard; and
        after displaying the preview image, receiving a decision from a user if the setup wizard is acceptable or unacceptable,
        wherein, in the case where the setup wizard is unacceptable, the actions performed repeat from displaying the questionnaire, and
        wherein, in the case where the setup wizard is acceptable, the actions performed further comprise:
            receiving a second decision from the user to either suspend a setup operation or to proceed with the setup operation; and
            performing the setup operation by executing the combined selected setting modules when the second decision is to proceed with the setup operation.

2. A computer-readable recording medium that stores instructions for setting an environment of a network device that is connected to a network, the instructions including a plurality of setting modules that are provided to realize a plurality of process settings independently of one another, the processing settings being required depending on the contents of a setting environment, the setting modules respectively corresponding to the process settings, wherein the instructions, when executed cause the network device to perform actions comprising:
    displaying a questionnaire containing a plurality of questions to inquire about functions to be used and the contents of a network environment, and obtaining answers to the questions;
    after obtaining answers to the questions, selecting a plurality of setting modules that need setting depending on the functions to be used and the network environment, using each of the answers obtained by the setup confirming section, and creating a setup wizard by combining the selected setting modules;
    creating and displaying a preview image based on the setup wizard; and
    after displaying the preview image, receiving a decision from a user if the setup wizard is acceptable or unacceptable,
    wherein, in the case where the setup wizard is unacceptable, the actions performed repeat from displaying the questionnaire, and
    wherein, in the case where the setup wizard is acceptable, the actions performed further comprise:
        receiving a second decision from the user to either suspend a setup operation or to proceed with the setup operation; and
        performing the setup operation by executing the combined selected setting modules when the second decision is to proceed with the setup operation.

3. A setup method for setting an environment of a network device that is connected to a network, wherein a plurality of setting modules are provided to realize a plurality of process settings independently of one another, the processing settings being required depending on the contents of a setting environment, the setting modules respectively corresponding to the process settings, the method comprising:
    displaying a questionnaire containing a plurality of questions to inquire about functions to be used and the contents of a network environment, and obtaining answers to the questions;
    selecting a plurality of setting modules that need setting depending on the functions to be used and the network environment, using each of the answers obtained to the questions, and creating a setup wizard by combining the selected setting modules;
    creating and displaying a preview image based on the setup wizard; and
    after displaying the preview image, receiving a decision from a user if the setup wizard is acceptable or unacceptable,
    wherein, in the case where the setup wizard is unacceptable, the actions performed repeat from displaying the questionnaire, and
    wherein, in the case where the setup wizard is acceptable, the actions performed further comprise:
        receiving a second decision from the user to either suspend a setup operation or to proceed with the setup operation; and
        performing the setup operation by executing the combined selected setting modules when the second decision is to proceed with the setup operation.

* * * * *